(12) United States Patent
Coles et al.

(10) Patent No.: US 7,870,490 B2
(45) Date of Patent: Jan. 11, 2011

(54) ON-THE-FLY DEVICE CONFIGURATION AND MANAGEMENT

(75) Inventors: Neil L. Coles, Redmond, WA (US);
Scott R. Shell, Kirkland, WA (US);
Hung M. Dang, Seattle, WA (US);
Yuhang Zhu, Bellevue, WA (US);
Miller T. Abel, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 794 days.

(21) Appl. No.: 11/274,539

(22) Filed: Nov. 15, 2005

(65) Prior Publication Data

US 2007/0113186 A1 May 17, 2007

(51) Int. Cl.
*G06F 15/177* (2006.01)
(52) U.S. Cl. ............ 715/735; 715/733; 715/734; 707/999.01; 709/220; 710/8; 717/120; 717/121; 719/327
(58) Field of Classification Search ......... 715/735; 709/220
See application file for complete search history.

(56) References Cited

U.S. PATENT DOCUMENTS

| | | | | |
|---|---|---|---|---|
| 6,311,321 B1 * | 10/2001 | Agnihotri et al. | ............ | 717/120 |
| 7,039,688 B2 * | 5/2006 | Matsuda et al. | ............. | 709/220 |
| 7,152,116 B1 * | 12/2006 | Austin et al. | ................. | 709/245 |
| 7,194,530 B2 * | 3/2007 | Kayashima et al. | .......... | 709/223 |
| 7,269,602 B2 * | 9/2007 | Kaappa | ................... | 707/104.1 |
| 7,269,821 B2 * | 9/2007 | Sahinoja et al. | ............. | 717/106 |
| 7,395,322 B2 * | 7/2008 | Harvey et al. | ................ | 709/220 |
| 7,433,936 B2 * | 10/2008 | Zhu et al. | .................... | 709/220 |
| 7,499,950 B2 * | 3/2009 | Draluk et al. | ....................... | 1/1 |
| 2003/0172162 A1 * | 9/2003 | Twede et al. | ................. | 709/226 |
| 2005/0004942 A1 * | 1/2005 | Madsen et al. | ........... | 707/104.1 |
| 2005/0010552 A1 * | 1/2005 | Kaappa et al. | .................. | 707/1 |
| 2005/0010585 A1 * | 1/2005 | Sahinoja et al. | ............. | 707/100 |
| 2005/0204068 A1 * | 9/2005 | Zhu et al. | .................... | 709/252 |
| 2005/0272455 A1 * | 12/2005 | Oommen | ..................... | 455/518 |
| 2006/0015626 A1 * | 1/2006 | Hallamaa et al. | ............ | 709/229 |
| 2006/0174242 A1 * | 8/2006 | Zhu et al. | .................... | 717/172 |
| 2007/0100968 A1 * | 5/2007 | Ordogh et al. | .............. | 709/220 |
| 2007/0100981 A1 * | 5/2007 | Adamczyk et al. | .......... | 709/223 |
| 2008/0104207 A1 * | 5/2008 | Pulkkinen et al. | ........... | 709/220 |

FOREIGN PATENT DOCUMENTS

JP    2004348341 A   * 12/2004

OTHER PUBLICATIONS

Open Mobile Alliance, "SyncML Device Management Tree and Description", Jun. 12, 2003, Open Mobile Alliance Ltd., Version 1.1.2.*

(Continued)

*Primary Examiner*—Alvin H Tan
(74) *Attorney, Agent, or Firm*—Woodcock Washburn LLP

(57) ABSTRACT

Translators are provided that enable automated and remote device configurations in an efficient and abstract manner. In one aspect, a device configuration system is provided. A configuration component stores one or more remote configuration trees for various devices. A translator component maps the remote configuration trees to at least one device configuration tree associated with the respective devices to enable device configuration in an automated manner.

17 Claims, 10 Drawing Sheets

OTHER PUBLICATIONS

Open Mobile Alliance, "SyncML Representation Protocol Device Management Usage", Jun. 12, 2003, Open Mobile Alliance Ltd., Version 1.1.2.*

Open Mobile Alliance, "SyncML Device Management Protocol", Jun. 12, 2003, Open Mobile Alliance Ltd., Version 1.1.2.*

Segawa et al, English translation of JP 2004348341 A, Dec. 2004.*

* cited by examiner

ON-THE-FLY DEVICE CONFIGURATION AND MANAGEMENT

BACKGROUND

Automated device configuration and management is one of many areas of software development that has experienced large amounts of growth in recent years. Such configuration technology can be applied to many devices or systems such as cell phones, laptops, or other portable computer devices that can be configured for various functional requirements from remote server systems. In some cases, a configuration manager controls software distribution and asset management inventory in a multi-platform environment. It can be designed for configuration, distribution, change, version, and asset management in a distributed computing environment or mobile device network. In general, the configuration manager provides an integrated solution for managing complex and distributed enterprise environments.

With a configuration manager or other automated configuration software, package software elements for devices can be readied for distribution and installation in the respective devices. This may include maintaining an integrated inventory database to determine targets for software distribution such as determining whether or not devices are at the latest software revision level. Configuration can include creating an automated workflow for an installation process or submitting and monitoring distribution workflows across an enterprise. Another configuration aspect includes updating reference databases to ensure continued compliance with newer software releases. This may include more complicated procedures such as managing an enterprise environment across firewalls without impacting enterprise security. This also enables extending the scope of a managed network to include pervasive devices, such as personal digital assistants (PDAs) and intelligent phones, for example, by automatically distributing and managing security patches, software updates, or other updated components to the devices as needed.

In general, software configurations are first developed for a set of devices. In some case, after creating software packages for the configurations, an administrator may produce a software package profile. The administrator may then assign subscribers to the profile, associating the software package profile contained in a profile manager. A file such as a resource group can be created to contain a set of target devices for configuration. The administrator generally also creates a profile to be distributed to a resource group such as for PDA devices and assigns the resource group as the subscriber to the profile. The administrator may also import software package blocks into a software package profile. When the import is performed, the software package blocks are transferred from endpoints where they were created at the configuration server. When, the database on the server is updated with the new software package information, the administrator then distributes the software packages through the network to device endpoints. A software distribution component distributes the software packages from a source host through a repeater hierarchy to gateways, for example, then from the gateways to the respective device endpoints.

Another function of software distribution components is to check endpoints for status information and to transmit configuration results back through the network, on a reverse path, to the configuration server. Status of the software packages on each endpoint can be updated in a configuration repository in some systems. The administrator can then verify that the software packages are correctly installed by checking software distribution log files or a configuration manager database. For device management, various objects that can be managed are often represented using a tree hierarchy that can be addressed via Uniform Resource Identifiers (URIs). Generally, the configuration server requests that operations (e.g., add, copy, update) are performed on a particular node in a device management tree. One obvious way to implement this type update is to have a 1:1 correspondence between an abstract device manager configuration tree and an underlying data store. However, this 1:1 scheme lacks flexibility and may not always be possible to deploy configurations to devices that may have a plurality of differing tree structures from the device manager.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Translator components are provided for simplifying device management and configuration including automated deployment of device configurations across a network. For device management, objects that can be managed are represented using a tree hierarchy that can be addressed via Uniform Resource Identifiers (URIs). A device management server can request that device operations such as add, copy, and update, for example, are performed on a particular node in a device management tree. The translator components enable configurations to be mapped to devices without requiring a 1:1 relationship between the device management server and a configuration tree associated with a respective device. Thus, the translator components improve upon 1:1 mappings by increasing the flexibility of the device by implementing a 1-to-many correspondence between the device manager tree and the underlying data stores in the devices.

In operation, the device management server sends commands to the device, which are processed by a configuration manager. The configuration manager routes these commands to the correct configuration service provider (CSP), which is a back-end component responsible for actually making the change requested by the command. The ability of CSPs (and/or other components on the device) to be able to translate Location URIs that are received from (or returned to) the configuration server or manager implies that the management tree on the device does not have to match the server tree exactly. This adds a great deal of flexibility to the device, since using translators it is possible for the same setting to appear in multiple places in the device management tree without having to modify the CSP tree to achieve this result. For example, a translator can be employed to maintain backward compatibility with old servers while allowing the device to update its respective management tree.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Translators are provided that enable automated and remote device configuration updates in an efficient and abstract manner. In one aspect, a device configuration system is provided. A configuration component stores one or more remote configuration trees for various devices. A translator component maps the remote configuration trees to at least one device configuration tree associated with the respective devices. In this manner, one-to-one mappings do not need to be maintained between remote configuration components and portable devices such as hand-held computers or cell phones, for example. The translators can automatically deploy configurations to the devices without having any particular knowledge of device configuration hierarchies that may have changed or become stale overtime.

As used in this application, the terms "component," "device," "tree," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
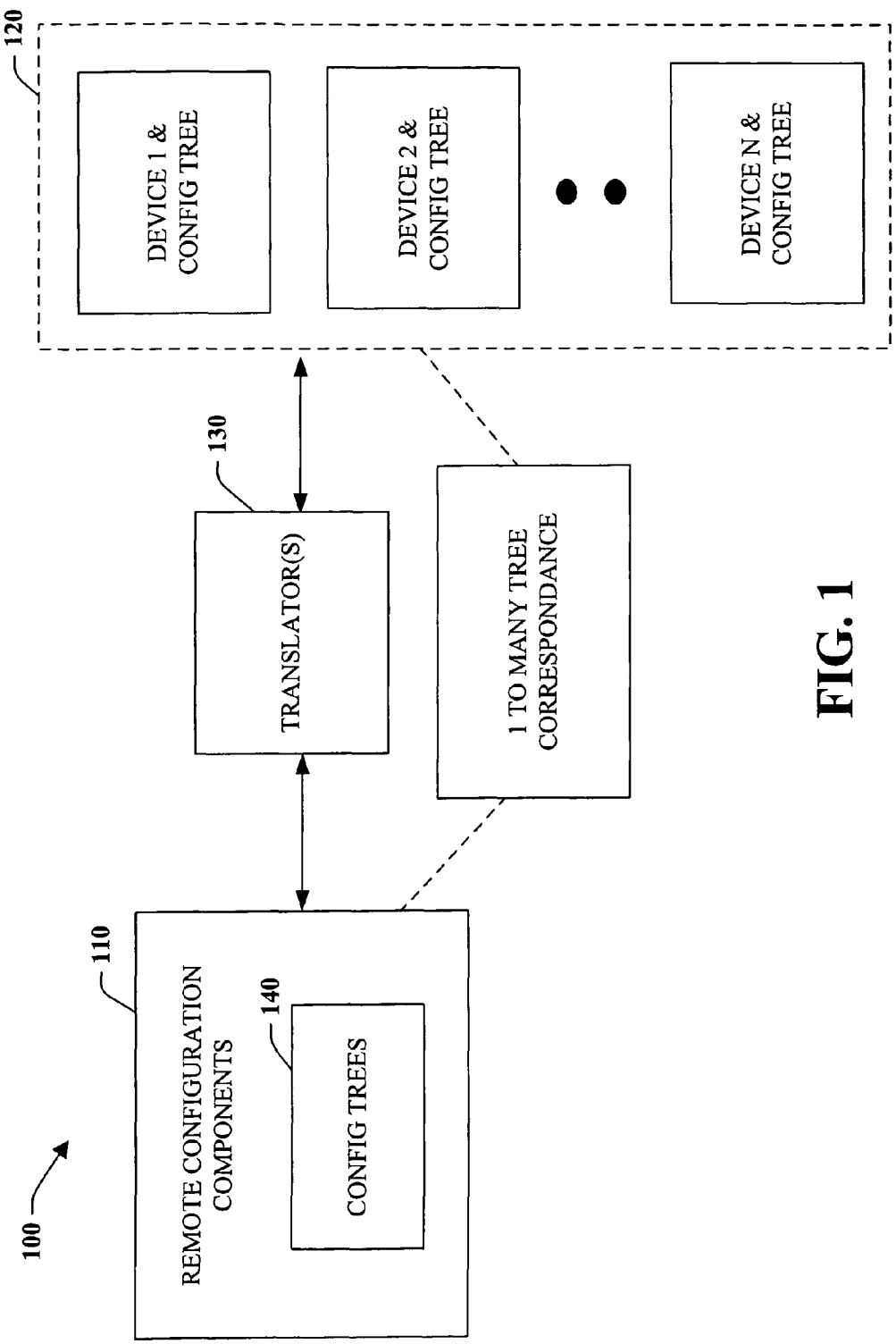
FIG. 1 is a schematic block diagram illustrating an automated configuration system.

Referring initially to FIG. 1, an automated configuration system 100 is illustrated. The system 100 includes one or more configuration components 110 that are employed to automatically update a plurality of devices 120 across local, remote, and/or wireless networks. A translator component 130 maps configuration trees 140 or hierarchies in the remote configuration components 110 to one or more configurations or trees in the devices 120. In one example, this can be achieved by mapping Universal Resource Identifiers (URIs) (or other component addressing scheme) in one instance or address on the remote configuration components 110 to a subsequent or alternative instance or address on the remote devices 120. Thus, a 1:1 mapping of tree hierarchies does not need to be maintained between trees on the configuration system or components and a device in order to configure the devices 120 from the remote configuration components 110.

It is noted that the remote configuration components can include substantially any type of computer system including one or more servers, clients, network devices, and/or administrative tools such as user interfaces for deploying configuration assets. Also, a plurality of network protocols can be employed for configuration updates including Internet protocols, Simple Object Access Protocols (SOAP), Extensible Markup Language files (XML), Wireless Access Protocols, and so forth. As can be appreciated, a plurality of configuration components 110 and/or protocols for deploying configuration data may be employed to update the devices 120.

In general, for device management 120, objects that can be managed are represented using a tree hierarchy that can be addressed via URIs as noted above although other addressing means can be employed. In one case, a device manager server acting as the remote configuration component 110 requests that operations (e.g., add, copy, update) are performed on a particular node in the device management tree associated with one or more of the devices 120. One obvious way to implement this relationship would be to have a 1:1 correspondence between an abstract device manager tree and an underlying data store for the devices 120. However, this 1:1 mapping lacks flexibility and may not always be possible. Thus, the translator 130 is provided to overcome complexities associated with conventional 1:1 mapping schemes. For example, in remote installations, users may want to abstract an actual installation path away from the installer (e.g., % CE2% may represent a Windows directory). Thus, the ability to translate either portions of a device manager URI path (or the entire path) allows such abstractions without requiring modifications to the device manager server or other remote configuration component 110. Another benefit of being able to translate device manager URI's is to provide transparent backward compatibility support for legacy servers managing new devices 120.

Figure 2:
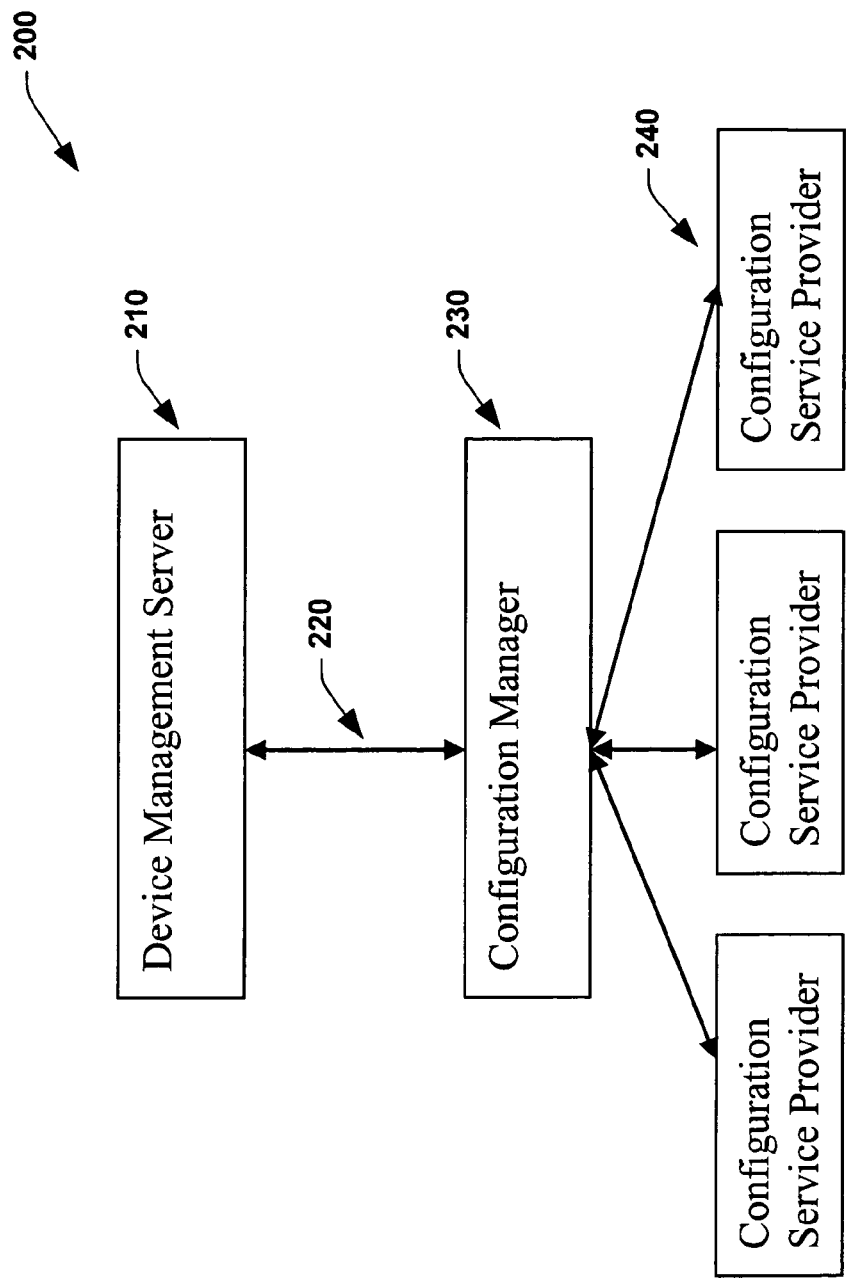
FIG. 2 illustrates an example device configuration system.

Referring now to FIG. 2, an example device configuration system 200 is illustrated. The system 200 includes at least one device management server 210 that communicates across a network 220 to a configuration manager (CM) 230 and one or more configuration service providers 240 that are associated with a given device. The device management server 210 sends commands to the device, which are processed by the configuration manager 230. The configuration manager 230 routes these commands to the desired configuration service provider (CSP) 240, which is the back-end component that is responsible for actually making changes requested by the command. To the device management server 230, the settings on the device appear as an abstract device management tree. Thus, individual nodes in the tree can be addressed using a Location URI (e.g., Vendor/Company/Registry/HKCU identifies the HKCU store in the registry). On the device, the configuration manager 230 and CSPs 240 correspond to a device management tree which can have a plurality of different forms and are described in more detail below with respect to FIG. 6.

One possible configuration implementation would require that the server management tree in the device management server 230 and the device management tree represented at components 230 and 240 would match each other, in order that Location URIs would address the correct settings on the device. As noted above, the translator component (not shown) provides the ability for the CSPs 240 (and other components on the device) to be able to translate Location URIs that are received from (or returned to) the device management server 210. This implies that the management tree on the device does not have to match the server tree in a 1:1 manner. Thus, a 1-to-many tree mapping is possible that adds a great deal of flexibility to the device, since using translators it is possible for the same setting to appear in multiple places in the device management tree without having to modify the CSP 240 to achieve such configuration. For example, a translator could be used to maintain backward compatibility with old servers while allowing the device to update its respective management tree. Another feature is the ability to translate URIs and values that represent objects in the device management tree that allows them to be rerouted to a different data store transparently to the device management server 210. For instance, the translation can occur as URIs and values are sent from the server 210 to be processed and also as the client or device returns results to the respective server.

It is noted that many translation schemes are possible including Translate-on-Device schemes versus Translate-on-Server schemes. In one example, a device type not known situation versus a device type known scenario is considered. For instance, when device type is not known in advance, a standardized tree can be targeted by the server, where the components described herein allows a particular implementation, or specific device type, to map a standardized tree to its own particular tree. Another example, is where a device type exposes multiple trees In this case, a device incorporating the various translation aspects described herein may expose more than one tree. This may be a combination of standardized and proprietary forms of device management schema. A server may target any of the forms it understands. Thus, the device, maps target URI from any of these exposed schema to its own internal tree (which itself may or may not be exposed for direct targeting).

Figure 3:
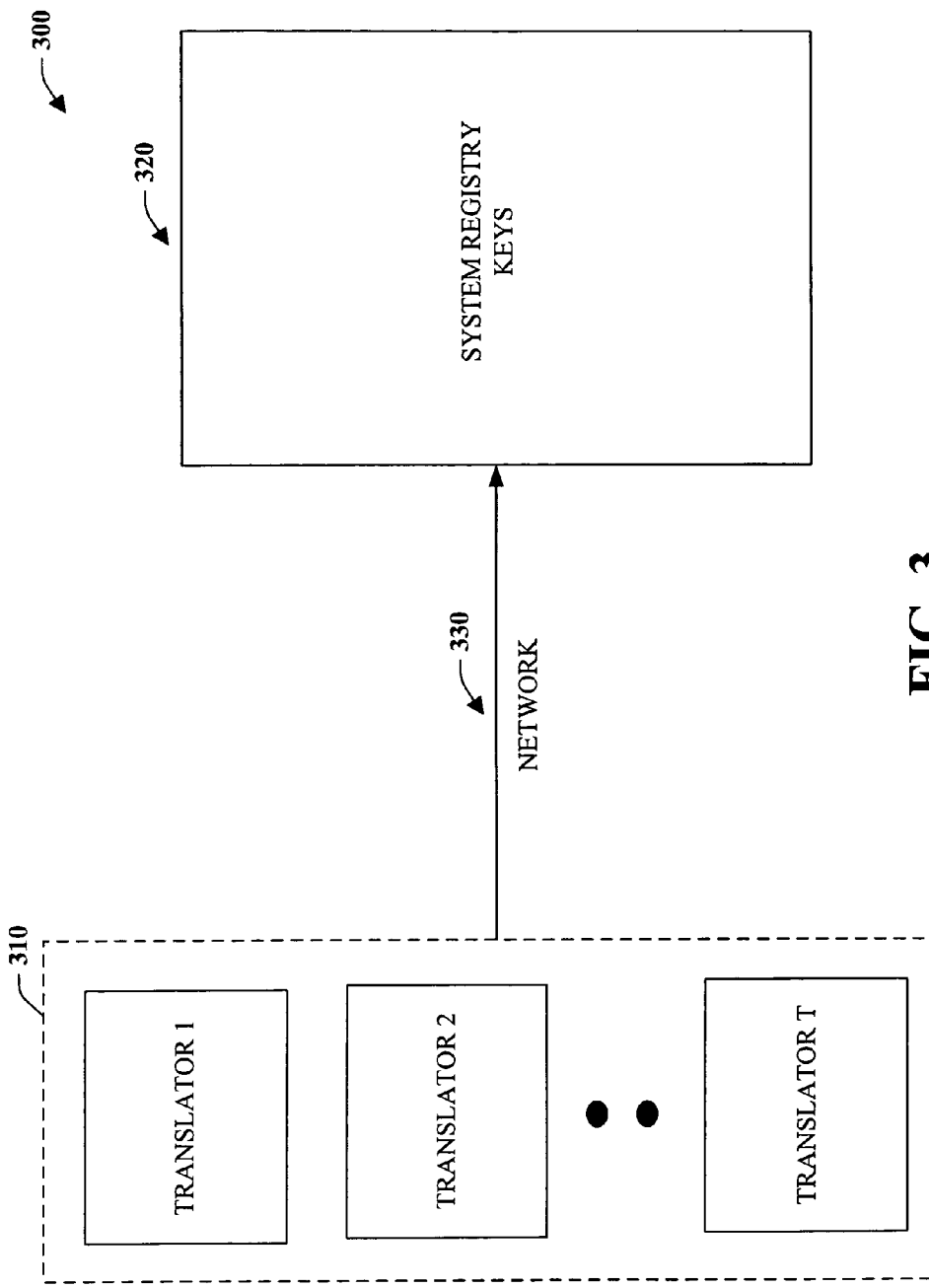
FIG. 3 illustrates a translator execution system.

Referring to FIG. 3, an example system 300 for translator execution is illustrated. In this case, one or more translators 310 are registered in a system registry 320 across a network 330. It is to be appreciated that the system 300 is but one way to execute a translator component. In one example execution, URI translators 310 can be registered in the same registry hierarchy that is used to register CSPs. To register a translator for a particular portion of a tree, a named value (e.g., "Translator") is added to the appropriate registry key. This value can be a GUID that identifies an object (e.g., COM object) which implements an e.g., ICSPURITranslator interface, for example. For instance, the following registry key adds a (hypothetical) translator for all URIs under a "./Vendor/Company/CertificateStore" node:

```
; CertificateStore translator
[HKEY_LOCAL_MACHINE\Security\Provisioning\CSPs\.\Vendor\Company\CertificateStore]
    Translator="{54C8177B-157B-48f2-BCF9-AD6B51744335}
```

Since translators 310 can be registered at substantially any point in a device manager tree, multiple translators may apply to a single URI. For example, when e.g., IConfigManager::GetNode (or GetNodeFromURI) is called, a configuration manager can traverse the registry and call all of the translators that apply to the URI in their respective turn. Each translator may then modify the URI by either adding or removing segments. Similarly, when e.g., IConfigNode::SetValue is called to change the value of the node, any translators that apply to the current node's URI can be called providing them an opportunity to modify the new value of the node before it is passed to an underlying configuration service provider.

In one example, the configuration manager supports translating paths (URIs) and node values. For example, an untranslated URI e.g., "./Vendor/Company/FileSystem/%CE2%/foo.txt" may be translated to e.g., "./Vendor/Company/FileSystem/Storage/Windows/foo.txt" when e.g., IConfigManager::GetNode is called. In this case, translation is automatic when the translator has been registered at 320.

Figure 4:
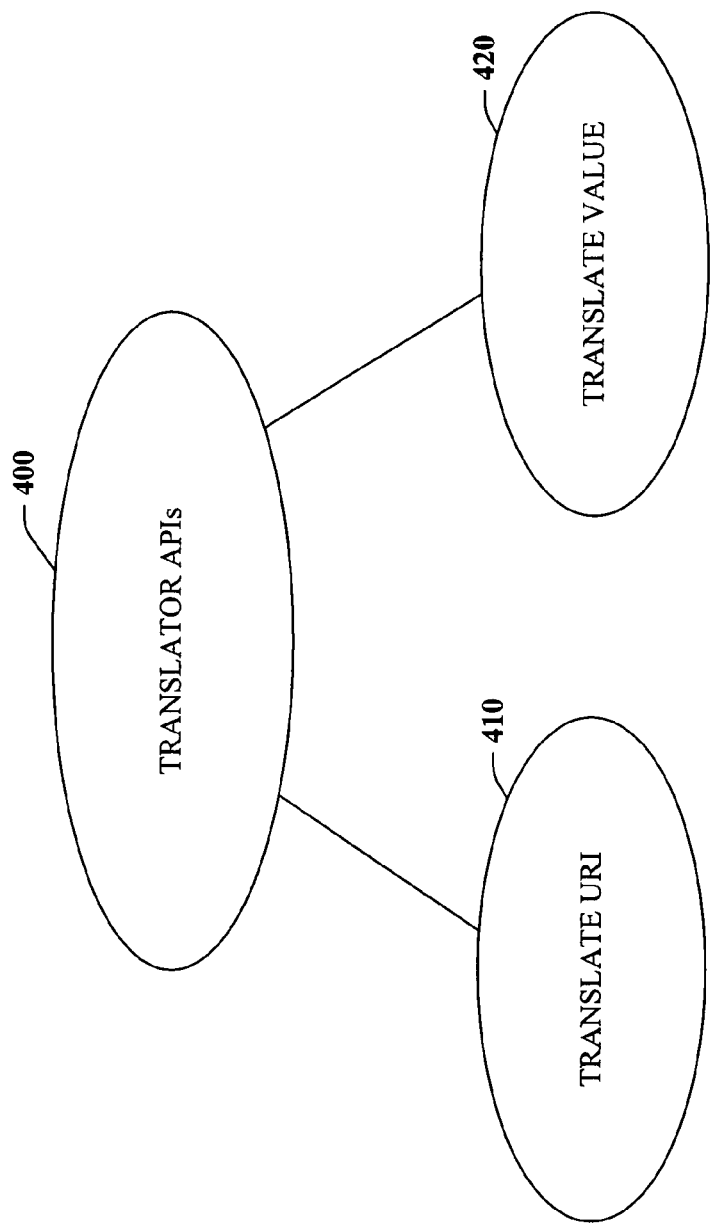
FIG. 4 illustrates example translator application programming interfaces.

Turning to FIG. 4, one or more translator application programming interfaces (APIs) 400 are illustrated. In one case, a translator URI API 410 may appear as follows:

| | |
|---|---|
| [in] IConfigManagerMutableURI* puriTranslate | Untranslated URI for the translator to modify |

The function 410 is typically not passed a full URI: it is passed a URI that is relative to the node in the tree from which the translator applies. For example, if a translator is registered at a "./Vendor/Company/CertificateStore" node, and IConfigManager::GetNode (or IConfigManager2URI::GetNodeFromURI) with the URI "./Vendor/Company/CertificateStore/ROOT/EncodedCertificate", then this method can be passed a relative URI "CertificateStore/ROOT/EncodedCertitificate," for example. At 420, a translate value API for input and output values may appear as follows:

| | |
|---|---|
| [in] IConfigManagerURI* puriNode | The URI of the node whose value is being changed |
| [in, out] VARIANT* pvarValue | The new value for the node |

It is noted, if a translator inserts new segments into the URI, then those segments can be subject to further translation by translators that are registered at deeper portions in the tree.

Figure 5:
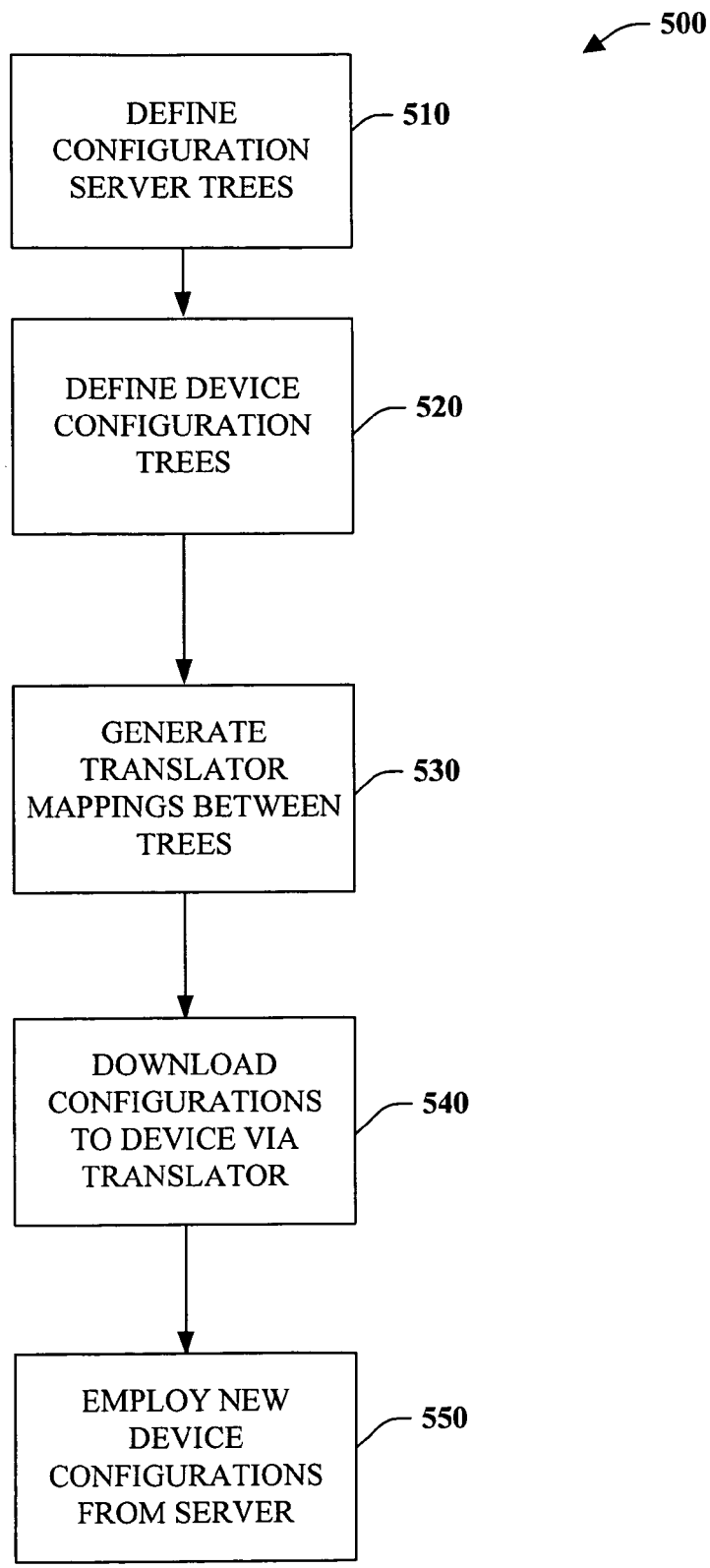
FIG. 5 illustrates an example translator process for configuring devices from remote network systems.

FIG. 5 illustrates an exemplary translator process 500 for remote device configurations. While, for purposes of simplicity of explanation, the process 500 is shown and described as a series or number of acts, it is to be understood and appreciated that the subject process is not limited by the order of acts, as some acts may, in accordance with the subject process, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject process.

Proceeding to 510 of the process 500, one or more configuration trees are defined at a server. Such trees can be employed for sending configurations, data, parameters, files, and so forth over substantially any type of network to substantially any type of device or updatable component. At 520, one or more device configuration trees are defined. Such device trees define the architectural configuration components such as configuration managers and configurations service providers that are employed to update a given device. These device trees define how device interfaces work, device operations, device functionality, and so forth.

At 530, one or more translators are defined that provide a mapping or translation from one or more trees defined at a configuration server to one or more trees associated with one or more devices. Such translation may convert an abstract configuration description from one tree, to an actual configuration description that conforms to a different style tree. As noted above, URI mappings or other address schemes may be provided that translate one style of configuration tree or hierarchy to one or more other trees or hierarchies. Translation elements can be registered in a device or client registry if desired. One form of registration can include global address mappings such as can be provided by a globally unique identifier (GUID), for example.

At 540, a translator is employed to download configurations or settings from a configuration server to one or more devices. This can include local network downloads such as across a USB connection, Internet downloads, wireless transactions and/or a combination thereof. At 550, after downloads of configurations have been completed in the device, devices, or other components via the translation component, respective devices can then be operated according to the newly downloaded functionality. Such devices can include computers, hand-held devices, audio or video devices, network devices, industrial devices, household devices, and/or other components that can be updated across one or more networks.

Figure 6:
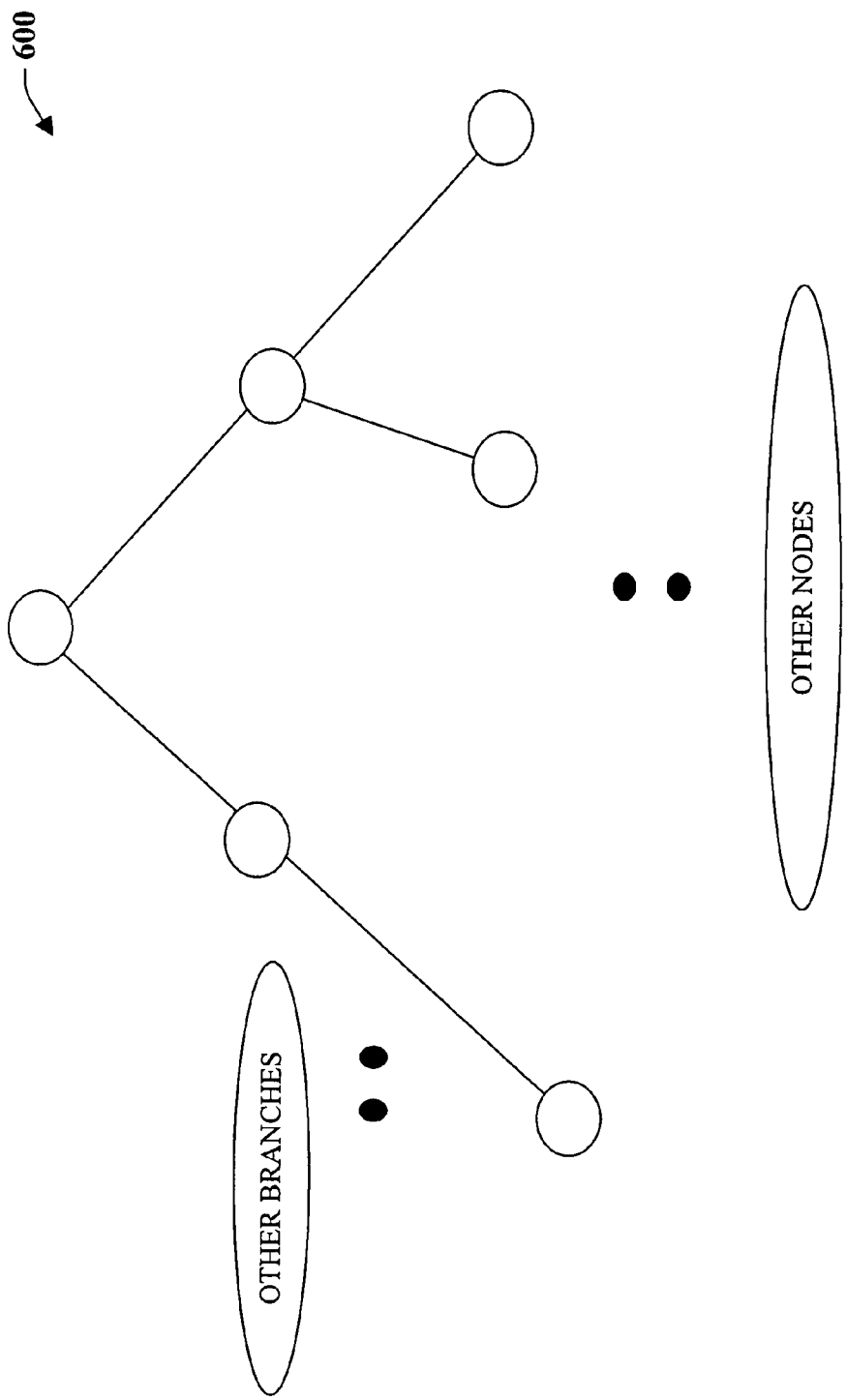
FIG. 6 illustrates an example configuration tree.

FIG. 6 illustrates an example configuration tree 600. It is noted that such tree 600 can include a plurality of nodes and branches, wherein a respective branch can have one or more nodes. As noted above, one tree 600 could be represented at a configuration server having one set of nodes and branches, whereas another tree having a different set of nodes and branches could be represented at a device. A translator component as described above can be provided to map configurations from one possible tree to one or more other tree configurations. From the point of view of a configuration server, device settings or configurations can be conceptualized as a hierarchical tree structure 600—a (device) management tree, each node of which represents an individual setting. A URI (e.g., RFC2396) uniquely addresses each node, and is formed from traversing the tree from the root node (named ".") to the desired node and appending each node's name to the previous one using a separator "/" as the delimiter character. It is to be appreciated that other addressing conventions are possible. In the hierarchical tree structure 600, there are generally two types of nodes: interior and leaf nodes. Interior nodes may have child nodes. A leaf node should not have any child nodes, but may have a data value.

Figure 7:
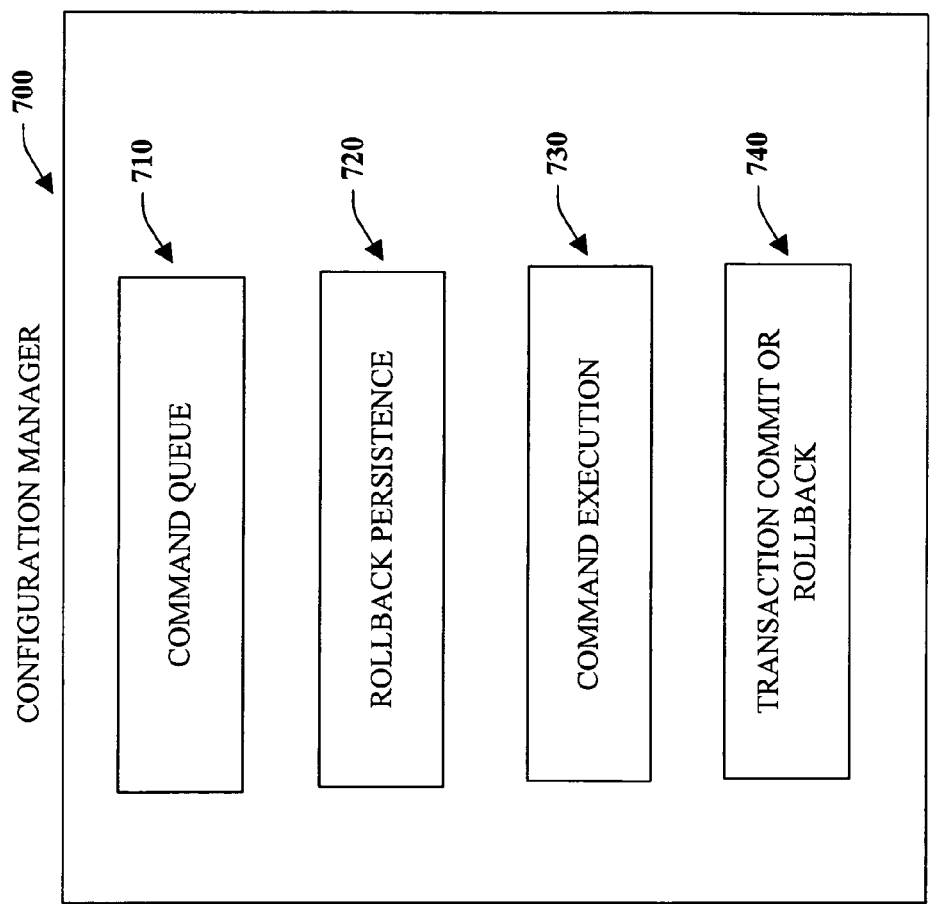
FIG. 7 illustrates an example configuration manager for remote device configurations.

FIG. 7 illustrates an example configuration manager 700. The configuration manager (CM) 700 can operate in various stages or phases. The first stage of command processing is a validation phase, although, technically, this phase occurs before an Execute phase, as each operation is invoked. When a consumer queries a configuration node from the configuration manager and invokes a method on the node, the configuration manager fires a corresponding event on the underlying configuration service provider (CSP). The CSP registers for these events by implementing an ICSPValidate interface. By processing these events, CSPs can validate parameters on each command, or query the user for more information (e.g., by displaying input user interface)—immediately (as opposed to waiting until CM Execute invocation).

In the CM 700, commands are typically placed in a command queue 710, and sequentially consecutive commands are grouped into atomic transactions, mirroring a consumer's grouping of operations into atomic transactions, which can consist of one command or multiple commands. By default, each command can be wrapped in a transaction by itself. In order to group multiple commands into a single transaction, the CM 700 methods BeginTransaction and CommitTransaction should be used. Each transaction can be processed sequentially, and should any fail, it generally does not affect processing of other commands.

At 720, for each command in a transaction, the command's rollback state is first saved, in case the command is to be rolled back upon failed execution. If the underlying CSP node is externally transaction-ed (i.e., depends on CM for operation atomicity), the CM's node wrapper queries the CSP node for its current state and saves it off in a byte stream for possible use later. For an operation on an internally transaction-ed CSP node (i.e., a node that handles its own rollback and operation commitment), the CM's node wrapper invokes the operation's corresponding rollback persistence method on the CSP node's ICSPNodeTransactioning interface (e.g., PersistRollbackAddState, PersistRollbackDeleteState), so that the CSP node can optionally save off its rollback state data in the same byte stream used by externally transaction-ed CSP nodes.

After rollback persistence at 720, the command itself is then executed at 730 i.e., for each operation invoked on a configuration node, the corresponding method is invoked on the underlying CSP node. The completion of this command execution should change the state of the node, although the potential for rollback remains until the completion of the commitment phase at 740, which comes after the execution.

If a transaction succeeds, it can be committed at 740, where the CM 700 invokes the node wrapper's Commit method. If the underlying CSP node is internally transaction-ed, the node wrapper invokes the CSP node's ICSPNodeTransactioning::Commit method; otherwise, the node wrapper effects clean up. Afterwards, it is assumed that there is insufficient state left to enact rollback should a node in the same transaction fail its commitment later on. If such a failure situation does occur, however, the HRESULT CFGMGR_E_TRANSACTIONINGFAILURE can be returned from CM's Execute method, and the state of the transaction is undefined.

If a transaction fails, it can be rolled back using the data in the rollback document formed during the rollback persistence phase 720. For each node operation that was executed, it is rolled back by invoking the corresponding rollback method on the node wrapper's ICSPNodeTransactioning interface. In turn, the node wrapper invokes the underlying CSP's corresponding rollback method on the CSP's ICSPNodeTransactioning interface—that is, if the CSP is internally transaction-ed. If the CSP is externally transaction-ed, the node wrapper invokes the contrary operation to restore the original state. Generally, the rollback sequence is the reverse of the execution sequence, starting from the last command executed (and which failed) in the transaction. The rollback continues along the sequence, whether or not rolling a command back fails, so that rollback brings the device state back as close to the original state as possible.

Figure 8:
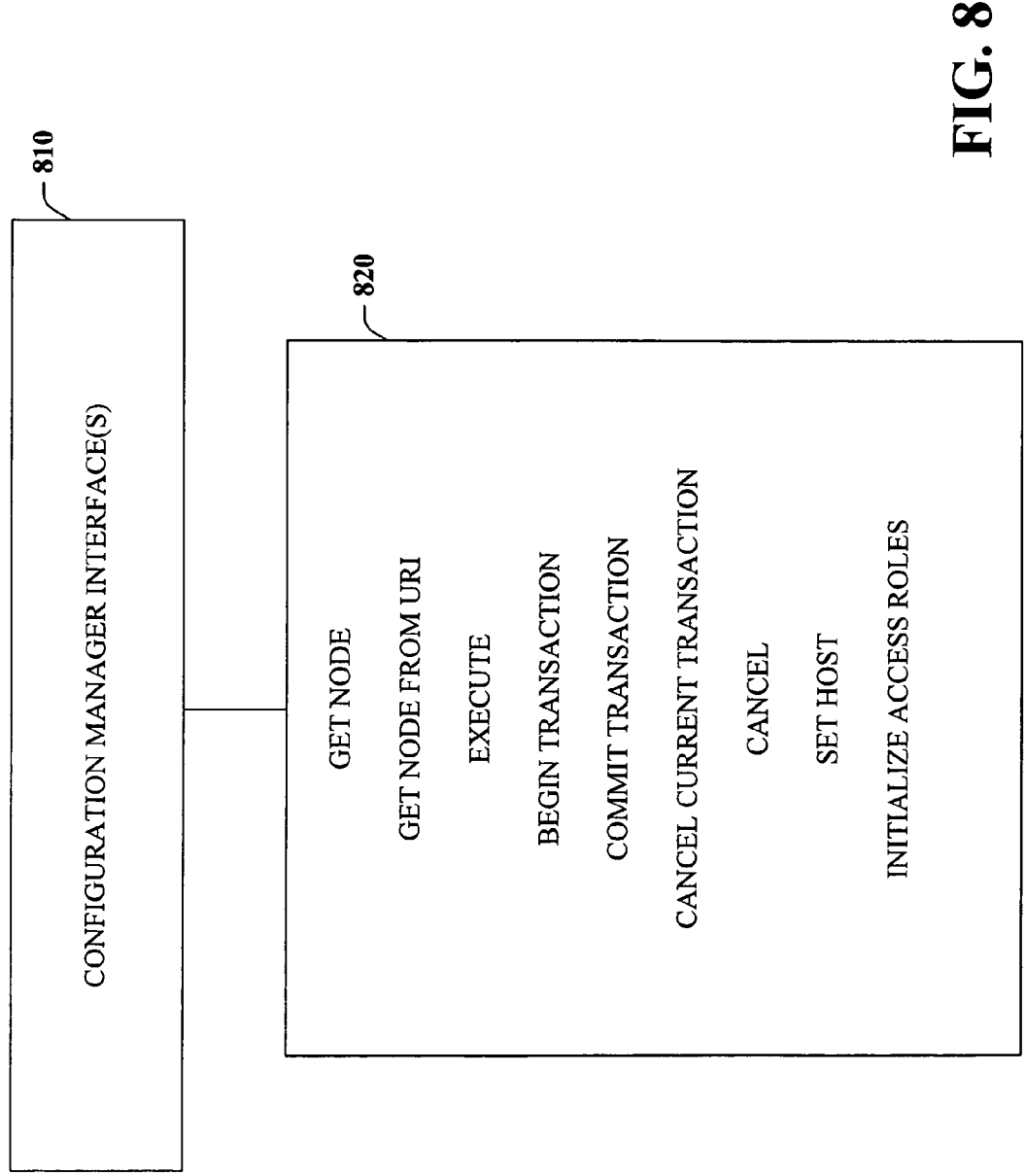
FIG. 8 illustrates example configuration manager interfaces.

Referring to FIG. 8, one or more configuration manager interfaces 810 can be employed to facilitate device configuration. Such interfaces 810 can include one or more application programming interfaces 820 (API) for managing and configuring devices across networks. Typically, a configuration manager (CM) can be instantiated with a call to CoCreateInstance and then a security role initialized with a call to InitializeAccessRoles as described below. Typically, a consumer then queries the configuration manager for a configuration node object, and then operates on it. One or more of the following API's 820 can be employed to facilitate device configurations:

| GetNode | |
| --- | --- |
| [in] BSTR bstrLocURI | URI of desired config node |
| [out] IConfigNode** ppNode | Returned config node |

Given a URI to a node, the GetNode API returns a desired configuration node. The URI will be passed to the appropriate translators before the URI is passed to the configuration service provider (CSP). It is noted, however, that this API should return a node, whether or not the desired node exists (i.e., whether the URI is valid). If node existence must be known, an IConfigNode::Exists API can be used. As an exception to this rule, however, an HRESULT CFGMGR_E_NODENOTFOUND can be returned from this API if the requested node URI is unknown to the CM (i.e., if the requested node is not a structural node and is not part of a known CSP's subtree). For example, a configuration node can be returned for the "./Vendor/Company/Registry/FooNode" URI because the URI references a (possible) node under a valid CSP (Registry); however, CFGMGR_E_NODENOTFOUND will be returned for the "./FooNode" URI, since it references neither a structural node (e.g., "./Vendor") nor a node under a valid CSP.

| GetNodeFromURI | |
| --- | --- |
| [in] IConfigManagerURI* puri | URI of desired config node |
| [out] IConfigNode** ppNode | Returned config node |

This API is similar to IConfigManager::GetNode, except that the URI of the desired configuration node is passed as an IConfigManagerURI object.

Execute—This API executes the batch of operations accumulated since the last invocation of Execute (or since the instantiation of CM if there is no previous invocation). After invoking this method, the CM command queue and data cache is cleared.

BeginTransaction—This API marks the beginning of a transaction. Subsequent operations (until the corresponding CommitTransaction is invoked) are grouped together and executed together such that, if one fails, all may fail. If this API is invoked twice without a CommitTransaction invocation in between, the HRESULT CFGMGR_E_ILLEGALOPERATIONINATRANSACTION is returned from a second BeginTransaction. It is noted that mandatory groups of settings should be set within a transaction.

CommitTransaction—This API marks the end of a transaction. Even though "commit" is part of the API name, this method groups antecedent operations (up to the previous BeginTransaction invocation) into a transaction. If this API is invoked without BeginTransaction having been invoked previously, the HRESULT CFGMGR_E_ILLEGALOPERATION OUTSIDE ATRANSACTION can be returned.

CancelCurrentTransaction—This API cancels the current transaction, and clears the CM's command cache up to the previous BeginTransaction invocation. If this API is invoked without BeginTransaction having been invoked previously, the HRESULT CFGMGR_E_ILLEGALOPERATIONOUTSIDEATRANSACTION can be returned.

Cancel—This API cancels the current batch of operations, and clears the command cache in the CM. It effectively re-initializes CM as if no operations were made.

| SetHost | |
| --- | --- |
| [in] Iunknown* pHost | COM object representing the CM host/client |

This API allows the CM client/host to communicate or pass data down to the CSP nodes that need it. The CM holds a reference to the host object until SetHost is invoked again with a NULL parameter (or another host object) to clear the reference.

| InitializeAccessRoles | |
| --- | --- |
| [in] DWORD dwSecRole | Base access role to apply to the entire session |

This API allows CM clients to specify what roles should be used for the configuration session. It is noted that roles passed in could be enhanced in the CM, depending on the GrantManager and GrantUserAuth policy settings, and so what is passed in is only a base access role, while the roles post-policy-application are processed roles. This method may be called as many times as desired, until the first configuration node operation is made, at which point further invocations to this method yields HRESULT_FROM_WIN32(ERROR_ALREADY_INITIALIZED). As can be appreciated, various other interfaces and/or API's can be employed to facilitate device configuration.

Figure 9:
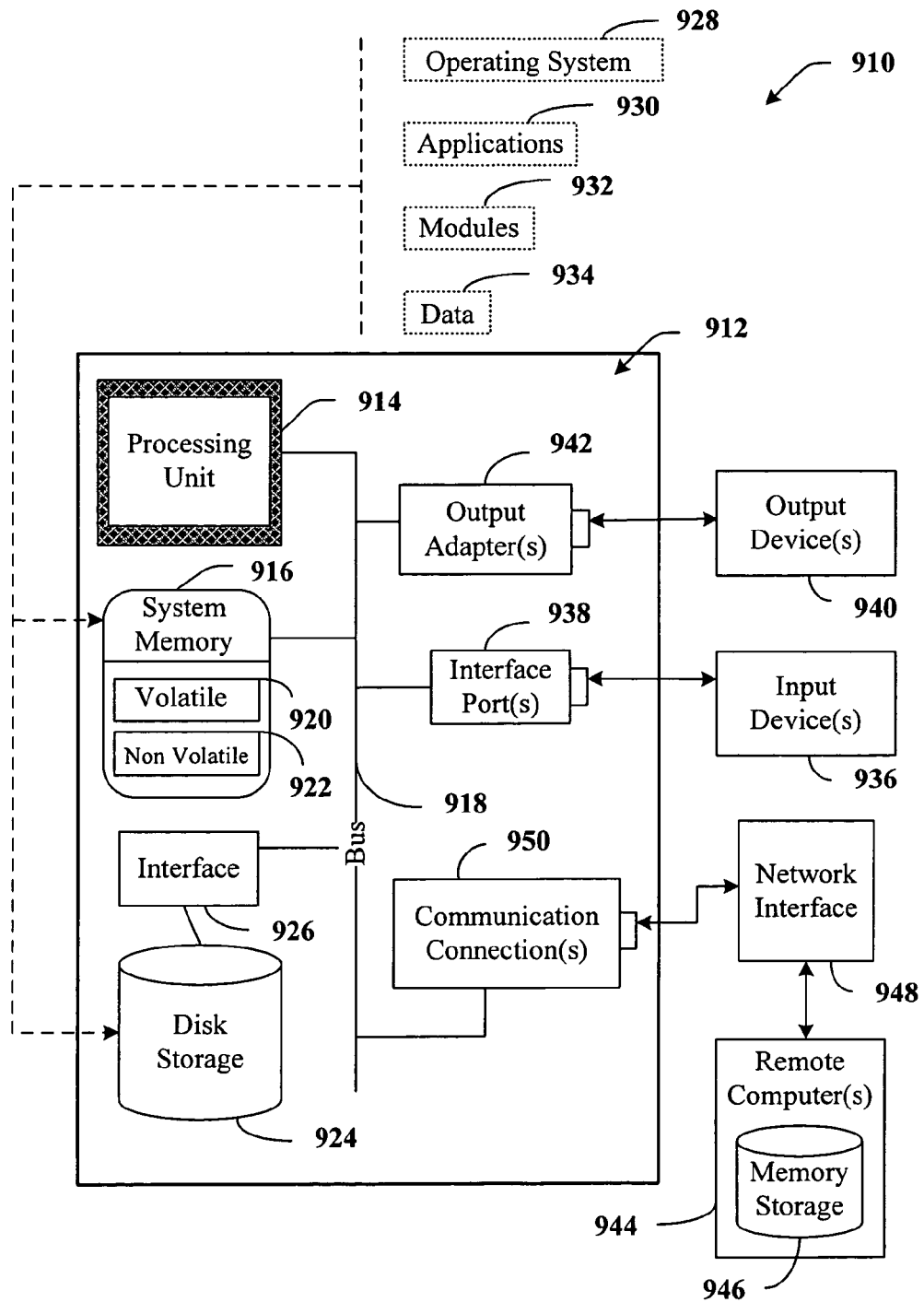
FIG. 9 is a schematic block diagram illustrating a suitable operating environment.
Figure 10:
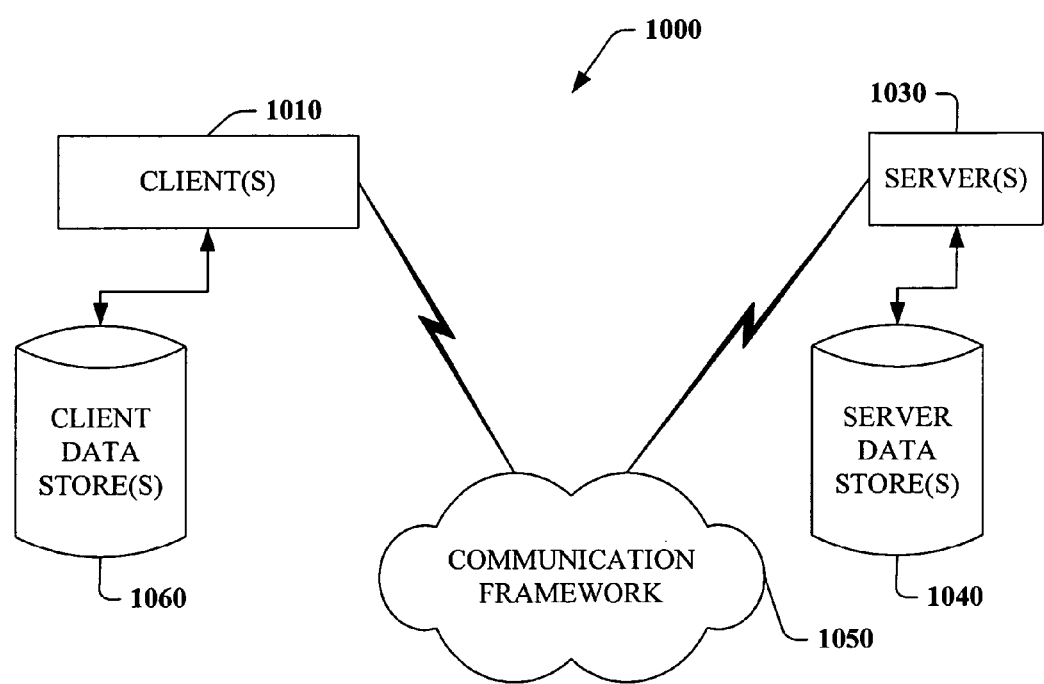
FIG. 10 is a schematic block diagram of a sample-computing environment.

In order to provide a context for the various aspects of the disclosed subject matter, FIGS. 9 and 10 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the invention also may be implemented in combination with other program modules. Generally, program modules include routines, programs, components, data structures, etc. that performs particular tasks and/or implements particular abstract data types. Moreover, those skilled in the art will appreciate that the inventive methods may be practiced with other computer system configurations, including single-processor or multi-processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network; However, some, if not all aspects of the invention can be practiced on stand-alone computers. In a distributed computing environment, program modules may be located in both local and remote memory storage devices.

With reference to FIG. 9, an exemplary environment 910 for implementing various aspects described herein includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that various components described herein can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, that require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 that can be employed. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the components described herein, for example. One possible communication between a client 1010 and a server 1030 may be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device configuration system, comprising:
a processor; and
a memory component communicatively coupled to the processor, the memory component having stored therein computer-executable instructions configured to implement the system including:
   a configuration component that stores a remote configuration tree for at least a first device and a second device, the remote configuration tree providing an abstract configuration description for each of the first and second devices, wherein the remote configuration tree comprises a plurality of nodes each representing an object, and wherein each node is addressable by use of a component address comprising a Universal Resource Identifier (URI); and
   a translator component that, in response to receipt of an operation request with respect to one of the nodes, maps the address associated with the node in the remote configuration tree to a component address of at least one node in each of at least one actual device configuration tree associated with the first device and at least one actual device configuration tree associated with the second device, the at least one actual device configuration tree associated with the first device having a different node structure and different component addresses than the at least one actual device configuration tree associated with the second device,
   wherein the translator component maps each URI on the remote configuration tree to corresponding URIs in the actual device configuration trees thereby allowing abstractions between each remote configuration tree URI and each corresponding actual device configuration tree URI without requiring modifications to the configuration component, wherein each URI on the remote configuration tree and its corresponding URIs in the actual device configuration trees represent a resource accessible to both the first and second devices.

2. The system of claim 1, the configuration component and the translator communicate across at least one network, the network includes a local network connection, a remote network connection, or a wireless network connection.

3. The system of claim 1, the configuration component includes one or more servers, clients, network devices, or administrative tool for deploying configuration assets.

4. The system of claim 3, further comprising a network protocol for deploying the configuration assets including Internet protocols, Simple Object Access Protocols (SOAP), an Extensible Markup Language (XML) protocol, or a Wireless Access Protocol.

5. The system of claim 1, further comprising a device manager server that requests that an operation request is performed on a particular node in a device management tree associated with one or more devices.

6. The system of claim 1, further comprising at least one device management server that communicates commands across a network to a configuration manager and one or more configuration service providers that are associated with a given device.

7. The system of claim 6, the device management server communicates with one or more settings on each of the first and second devices that appear as an abstract device management tree to the server, wherein individual nodes in the abstract device management tree are addressed using a Location Uniform Resource Identifier (URI).

8. The system of claim 7, further comprising a component to translate URIs and values that represent objects in the abstract device management tree in order to be rerouted to a different data store transparently to the device management server.

9. The system of claim 1, the translator component is accessed in a system registry across a network, according to a Component Object model, or according to a globally unique identifier.

10. The system of claim 1, further comprising a component to enable the translator component to add or remove segments from a Uniform Resource Identifier (URI), a component to modify a value for a configuration node before the node is passed to a configuration service provider, or at least one application programming interface to translate a configuration node or to translate a value for a configuration node.

11. A computerized translation method for device configuration, comprising:
employing a processor to execute computer executable instructions stored on a computer readable storage medium to implement the following acts:
   defining an abstract server configuration tree comprising a plurality of nodes each representing an object, wherein each node is addressable by use of a Universal Resource Identifier (URI);
   defining a first actual device configuration tree and a second actual device configuration tree;
   requesting an operation with respect to one of the nodes;
   automatically mapping data from the URI associated with the node in the abstract server configuration tree to a URI of at least one node in each of the first actual device configuration tree and the second actual device configuration tree, the first actual device configuration tree having a different node structure and different component addresses than the second actual configuration tree,
   wherein each URI on the remote configuration tree is mapped to corresponding URIs in the actual device configuration trees thereby allowing abstractions between each abstract server configuration tree URI and each corresponding actual device configuration tree URI without requiring modification to the abstract server configuration tree, wherein each URI on the abstract server configuration tree and its corresponding URIs in the first and second actual device configuration trees represent a resource accessible to both the first and second devices; and
   automatically downloading configuration data to at least one configuration service provider associated with a device.

12. The method of claim 11, further comprising defining one or more application programming interfaces (API's) to facilitate configuration of at least two devices, the API's include a get node API, a get node from API, an execute API, a begin transaction API, a commit transaction API, a cancel current transaction API, a set host API, and an initialize access roles API.

13. The method of claim 11, further comprising employing a standardized tree that is targeted by a server to allow a particular implementation, or specific device type, to map a standardized tree to its own particular tree.

14. The method of claim 11, further comprising enabling a device type to expose multiple trees.

15. The method of claim 11, further comprising generating a combination of standardized and proprietary forms of a device management schema.

16. The method of claim 11, further comprising mapping a target Uniform Resource Identifier (URI) from at least one exposed schema to an internal tree.

17. A translator system for device configuration, comprising:

means for downloading abstract device data from at least one server, the abstract device data being associated with a node of an abstract configuration tree, and wherein the node is addressable by use of a component address comprising a Universal Resource Identifier (URI);

means for updating actual settings data for at least a first device and a second device;

means for mapping the component address of the abstract device data to each of a component address of a first configuration tree including the updated actual settings data for the first device and a component address of a second configuration tree including the updated actual settings data for the second device, the first configuration tree having a different node structure and different component addresses than the second configuration tree, the abstract device data providing an abstract configuration description for each of the first and second devices; and means for executing the abstract device data on the at least two first and second devices, wherein each URI on the abstract configuration tree is mapped to corresponding URIs in the first and second configuration trees thereby allowing abstractions between each abstract configuration tree URI and each corresponding first and second configuration tree URI without requiring modification to the abstract configuration tree, and wherein each URI on the abstract configuration tree and its corresponding URIs in the first and second configuration trees represent a resource accessible to both the first and second devices.

* * * * *